Jan. 20, 1970  G. LANGE  3,490,809
PIECE OF FURNITURE
Filed Feb. 23, 1968  2 Sheets-Sheet 1

INVENTOR.
Gerd Lange
BY
Michael J. Striker

Jan. 20, 1970     G. LANGE     3,490,809

PIECE OF FURNITURE

Filed Feb. 23, 1968     2 Sheets-Sheet 2

INVENTOR.
Gerd Lange
BY
Michael I. Stiller

United States Patent Office 3,490,809
Patented Jan. 20, 1970

3,490,809
PIECE OF FURNITURE
Gerd Lange, Kapsweyer, Pfalz, Germany, assignor to Firma Wilhelm Bofinger, Ilsfeld, Heilbronn, Germany
Filed Feb. 23, 1968, Ser. No. 707,520
Claims priority, application Germany, Oct. 24, 1967, B 73,190
Int. Cl. A47c 4/00, 7/54
U.S. Cl. 297—440                                21 Claims

ABSTRACT OF THE DISCLOSURE

In a piece of furniture the connection between a first and a second elongated structural member is effected by coupling means which releasably couples said members to one another, such coupling means including a male coupling portion which is provided on one of the members and a female coupling portion which is provided on the other of the members and which is adapted to straddle the male coupling portion. The coupling portions are engageable in response to movement of the other member to a coupling position longitudinally thereof towards the one member in predetermined direction transversely of the elongation of the one member and the connection is releasable in response to reversal of such movement.

BACKGROUND OF THE INVENTION

The present invention generally relates to furniture, and more particularly to furniture consisting of constituent components which can be assembled and disassembled at will. More particularly the invention relates to such pieces of furniture as chairs and the like.

It is becoming more and more common for pieces of furniture to be so constructed that they can be assembled and disassembled at the will of a user. This is advantageous not only for transport and storage of the furniture prior to the sale thereof, but also when the furniture has to be moved by the owner, for instance when a change of residence is involved. In metal furniture this can be accomplished relatively easily by the use of screw connections or bolt connections. In wooden furniture, that is in more elegant pieces of furniture, the use of similar connections is of course possible but is very objectionable from a point of view of aesthetics. Also, the use of such connections requires at least some skill with tools for assembly and disassembly and it has been found that this cannot be generally assumed to be present in the majority of purchasers.

It is therefore a general object of the present invention to overcome the disadvantages known from the existing state of the art.

A more particular object of the invention is to provide means for rapidly assembling and disassembling pieces of furniture without the use of tools and/or separate connecting instrumentalities.

A concomitant object of the invention is to provide for such rapid assembly and disassembly of pieces of furniture, and particularly wooden furniture which is very simple and inexpensive.

SUMMARY OF THE INVENTION

In accordance with one feature of my invention I provide, in a piece of furniture, a first and a second elongated structural member. Coupling means is provided for releasably coupling these members to one another and this includes a male coupling portion provided on one of the members and a female coupling portion provided on the other of the members. The female coupling portion is adapted to straddle the male coupling portion and can be engaged therewith in coupling relationship in response to movement of the aforementioned other member to a coupling position longitudinally thereof towards the one member in a predetermined direction transversely of the elongation of the one member. To release this coupling connection it is simply necessary to reverse the movement of the other member or to move the one member in the predetermined direction.

The novel features which are considered to as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
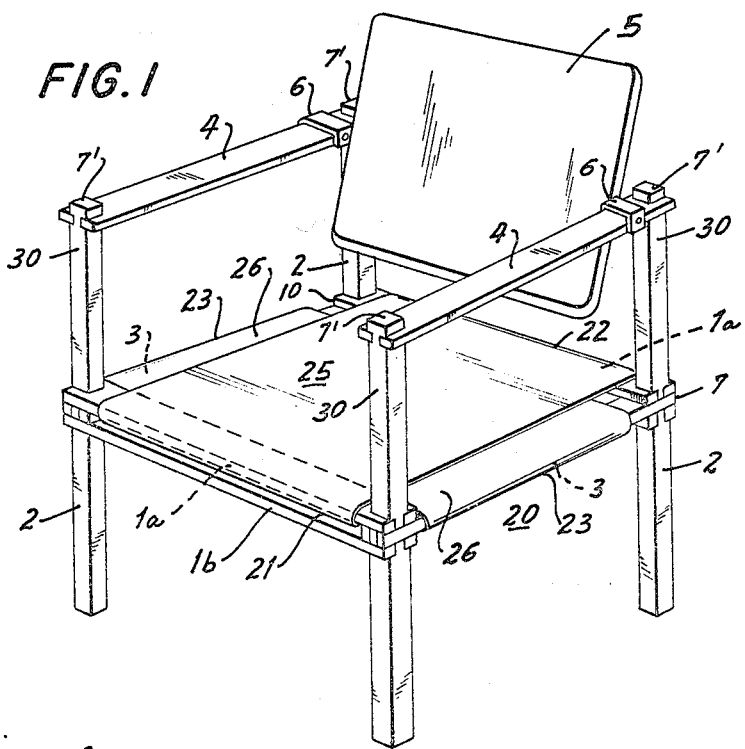
FIG. 1 is a perspective view of a chair constructed in accordance with the present invention.
FIG. 2 is an exploded view of a joint utilizing the novel coupling herein disclosed.

Discussing now the drawing in detail, and firstly FIG. 1 thereof, it will be seen that the chair there illustrated comprises frame portions which generally define the seat of the chair and upright portions or leg portions which define the legs of the chair. The frame or seat of the chair is generally identified with reference numeral 20 and consists of a first pair of elongated structural members 1a and 1b which are superimposed and coextensive at the front edge 21 of the frame 20, and a second pair similar to the first pair and located at the rear edge 22 of the frame 20. The members 1a and 1b of each of these pairs are slightly spaced from one another as evident at the front edge 21 in FIG. 1 and they are all of flat rectangular cross-section. Laterally, the frame 20 is completed by the frame members 3 which are located at their respective lateral edges 23 of the frame 20. The respective members 1a and 1b and the members 3 which extend normal to the members 1a and 1b are connected together and cooperate with the respective upright or leg members 2 which are of substantially quadratic cross-section although this may of course differ just as the cross-section of the members 1a and 1b and 3 may differ.

FIG. 2 is an exploded detail view, illustrating how the members 1a, 1b and 3 are connected to the respective upright members 2. The joint illustrated in FIG. 2 is that which is identified with reference numeral 7 in FIG. 1 but the other joints of the chair shown in FIG. 1 are of course analogous so that a description of the joint 7 illustrated in FIG. 2 is representative of all joints.

FIG. 2 shows the superimposed members 1a and 1b located at the rear edge 22 of the frame 20 and the member 3 located at the edge 23 which in FIG. 1 is located at the right-hand side of the drawing. It will be seen that the upright member 2 is provided with male connecting means 10 for each of the members 1a, 1b and 3. This male connecting means 10 comprises two grooves provided in mutually opposite surfaces of the upright member 2 and having bottom walls 13 and 14, these bottom walls 13 and 14 cooperating with the longitudinally extending projections 11 and 12 provided on the member 1a by bifurcating the end portion 15 of the member 1a through provision of a slot 17. Thus, the portion of reduced thickness created in the upright member 2 and bounded by the bottom walls 13 and 14 is receivable in the slot 17 of the member 1a in response to movement of the member 2 in the direction of the arrow A towards the member 1a or conversely by movement of the member 1a in the direction of the arrow A associated therewith towards the member 2. Downwardly spaced from the reduced portion of the member 2 which is bounded by the bottom walls 13 and 14 a similar reduced portion is provided and is bounded by the bottom walls 13' and 14'. This is engageable with the end section of the member 1b which corresponds precisely to that of the member 1a. Engagement is effected again by movement of the member 2 in the direction of the arrow A" or by movement of the member 1b in the direction of the arrow A" associated with the member 1b. Intermediate these two portions of reduced thickness the member 2 is provided with still a further portion of reduced thickness, also bounded by bottom walls which here are identified with reference numerals 13" and 14". However, these bottom walls 13" and 14" extend at right angles to the bottom walls 13, 14 and 13', 14'. The end section 15 of the member 3 is configurated so as to correspond to the end sections 15 of the members 1a and 1b and it is engageable with the portion 16 of the member which is provided with and bounded by the bottom walls 13" and 14" in response to movement of the member 2 in the direction of the arrow A' associated therewith or in response to movement of the member 3 in the direction of the arrow A' associated with the member 3. It is of course clear that the necessary material removal required to provide the female coupling portions constituted by the end sections 15 of the members 1a and 1b, and 3, and the male coupling portions provided on the member 2 can be accomplished in a most simple manner by use of conventional machines. It is also clear that no tools whatsoever are required to assemble the joint 7. Once assembled the joint can be released only by movement of the respective members in the direction oppositely the arrows associated therewith, and because of the polygonal cross-section of the slot 17 and of the portions 16 of reduced cross-section on the member 2 turning movement of the connected members with reference to one another is impossible. Also, because the portion 16 which is provided with the bottom walls 13" and 14" projects outwardly beyond the bottom walls 13, 14 and 13', 14', axial movement of the members 1a, 1b and 3 with reference to the elongation of the member 2 is impossible. Furthermore, bifurcation of the end sections 15 of the members 1a, 1b and 3 and the polygonal cross section of the member 2, or more particularly of the male coupling portions thereof, prevent turning movement of the members 1a, 1b and 3 about their respective axis.

Because the direction in which the members 1a, 1b and 3 engage the member 2 in coupling relationship alternate, so that the member 3 engages the member 2 at right angles to the direction in which the members 1a and 1b engage the member 2 the provision of two fabrics or other webs 25 and 26 suffices to maintain the joint in connected condition. FIG. 1 illustrates that a first web 25 is looped around and exerts inwardly directed pull on the members 1a located at the front edges and rear edges 21 and 22 of the chair, whereas a second web 26 similarly connects the members 3 extending along the lateral edges 23 of the chair. Thus, the loops 25 and 26 extend crosswise to one another and the members 1a and 1b of each pair, as well as the members 3 of each of the lateral pairs of members, are urged against the associated upright members 2 transversely of the direction in which the respective female coupling portions engage the respective male coupling portions provided on the upright members 2. This prevents undesired disengagement of the joints 7, of which only one is illustrated in detail in FIG. 2 and maintains the various members in the desired relative positions in which they are reliably connected to one another. The webs 25 and 26 may of course consist of various different materials, and they need not be unitary but may consist of individual loops, just as they may be replaced by cord or other instrumentalities capable of exerting the necessary inwardly directed pull. The webs 25 and 26 also provide the seat of the chair as is illustrated in FIG. 1.

It is clear, also, that the web 25 may for instance be connected with the member 1a at the front edge 21 and with the member 1b at the rear edge 22 or that this connection may be reversed, without detracting from the reliability of the connection thus established.

The upright members 2 each comprise a section 30 extending upwardly above the seat which is constituted by the webs 25 and 26 and the upper free ends of these sections 30 are connected to elongated arm-support members 4 in the same manner in which either of the members 1a and 1b and 3 is connected with the respective uprights 2. Thus, a more detailed discussion of this connection, generally identified with reference numeral 7', is not believed necessary. These joints 7' are maintained in connected relationship by the pull exerted by the web 25 or analogous means, which may be substituted for the web 25. The necessary pull of the webs 25 and 26 can be provided in various different manners, for instance by providing the respective ends of each web, which are located underneath the seat in FIG. 1 and therefore not visible, with eyelets and looping cord therethrough, or by using buckles, cooperating hooks and eyes, or any similar suitable means. If the web 25 extends from the member 1a at the front edge 21 to the member 1b at the rear edge 22, which is not illustrated, the seat will have a rearward inclination and the webs 25 and 26 will exert a certain tension on one another, both of which may be desirable in some circumstances.

Figure 3A:
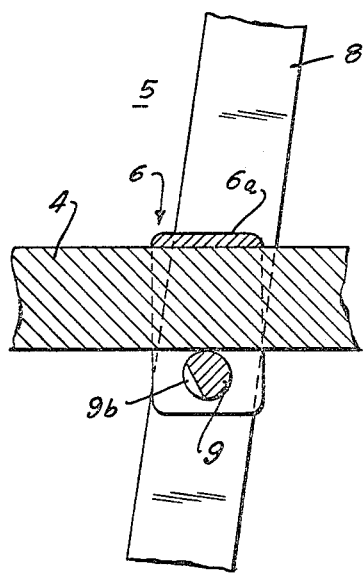
FIG. 3a illustrates a removable clamping connection for use in the chair in FIG. 1 in one position of the use.
Figure 3B:
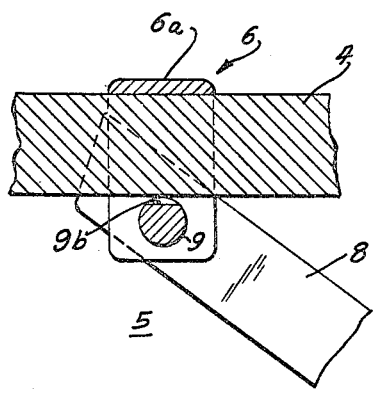
FIG. 3b illustrates the clamping connection of FIG. 3a but in another position of use.
Figure 4:
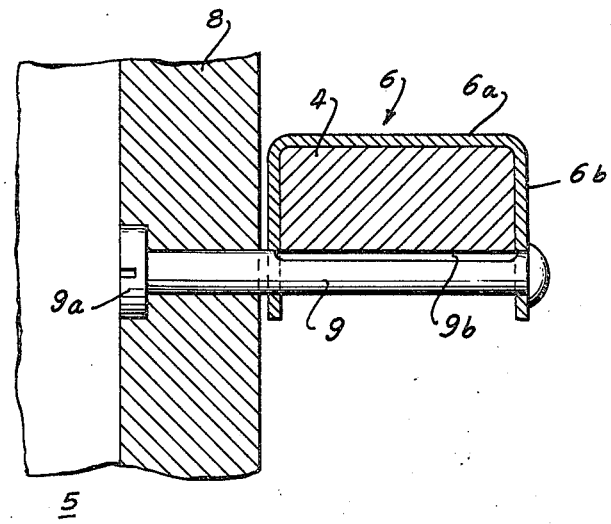
FIG. 4 is a section through the clamping connection of FIGS. 3a and 3b taken on a line normal to the plane of the drawing.

A back support member 5 (compare FIG. 1) is provided and is connected to the arm support members 4 by means of releasable clamping connections 6. These latter are illustrated in more detal in FIGS. 3a, 3b and 4 where it will be seen that each of the clamping connections 6 is constituted by a general U-shaped member 6a which engages and overlies the respective arm support member 4 and which is provided in its legs 6b with aligned bores (not identified with reference numerals) through which bolts 9 extend underneath the respective arms of the member 4. The bolts 9 are secured in lateral portions 8 of the back support member 5 by means of head portions 9a, for instance of polygonal outline so that they cannot be turned with reference to the portions 8. They are provided with a flat face 9b in the region in which they pass underneath the repective arm support member 4 so that when the portion 8 of the back suport member 5 is turned, into the position illustrated in FIG. 3a the bolts 9 are loosened and shifting is possible, whereas when the member 8 is turned into the position illustrated in FIG. 3b shifting becomes impossible and firm connection with the respective arm support member 4 is established as illustrated in FIG. 4.

It will be appreciated that various modifications and changes of the illustrated embodiments are possible without departing from the concept of the invention. Thus, arresting means can be provided which, in addition to the webs 25 and 26, serve to prevent undesired separtion of the joints 7. Such arresting means may be cooperating arresting portions which engage one another with a snap action, they may be spring means which effect biasing of the respectively engaging members of the joints 7 in a sense maintaining the members in connected condition, and these arresting means may be free or substantially free of any stresses simply by being so positioned that stresses are transmitted to the various connected members but not to the arresting means. The particular construction of the joint here involved makes this readily possible. It is also possible in many cases to utilize already existing portions of a piece of furniture, that is portions which will be provided in any case and primarily for other purposes as arresting means. Thus, cords, belts or other looped members used in such pieces of furniture for other purposes than the webs 25 and 26 may be so positioned that they will serve as auxiliary arresting means to prevent undesired separation of the joints 7.

It will be understood that each of the elements described above, or two or more together, may also find a useful application in other types of constructions, differing from the types described above.

While the invention has been illustrated and described as embodied in a piece of furniture, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. In a piece of furniture the combination of a first, second and an additional elongated structural member all of which extend normal to each other; coupling means for releasably coupling said members to one another, said coupling means including a pair of male coupling portions provided on one of said members and female coupling portions provided on the other of said members and on said additional member and each being adapted to straddle one of said male coupling portions, said coupling portions being engageable in coupling relationship in response to movement of said other member and said additional member to a coupling position longitudinally thereof towards said one member in predetermined direction transversely of the elongation of said one member, and being releasable in response to respective movement of said other member and additional member to a release position in direction oppositely said predetermined direction and means operatively associated with said members for normally preventing movement thereof from said coupling position to said release position.

2. In a piece of furniture, the combination of a first and a second elongated structural member; and coupling means for releasably coupling said members to one another, said coupling means including a male coupling portion provided on one of said members and a female coupling portion provided on the other of said members and being adapted to straddle said male coupling portion, said coupling portions being constructed and arranged so as to be engageable in coupling relationship in response to movement of said other member to a coupling position longitudinally thereof towards said one member in predetermined direction transversely of the elongation of said one member, and being releasable only in response to movement of said other member to a release position in direction oppositely said predetermined direction but not in direction transversely to said predetermined direction and of the elongation of said other member.

3. In a piece of furniture as defined in claim 1; and further comprising means operatively associated with said members and normally preventing movement thereof from said coupling position to said release position.

4. In a piece of furniture as defined in claim 1, wherein said female coupling portions are constituted by bifurcated end sections of said other member and said additional member.

5. In a piece of furniture as defined in claim 4, wherein said end sections extend in the direction of elongation of the respective member.

6. In a piece of furniture as defined in claim 5, wherein said other member and said additional member are of substantially rectangular cross-section.

7. In a piece of furniture as defined in claim 5, wherein said end sections are integral with said other member and said additional member, respectively.

8. In a piece of furniture as defined in claim 5, wherein said female coupling portions each comprise two transversely spaced parallel projections each provided with an abutment face facing inwardly towards the corresponding abutment face of the other projection; and wherein said male coupling portions comprise two pairs of grooves provided in oppositely directed surfaces of said one member and each having a bottom wall, said projections being adapted to extend into said grooves with said abutment faces being juxtaposed with the bottom wall of the respective groove.

9. In a piece of furniture as defined in claim 8; further comprising a further elongated structural member coextensive with said other member and provided with further female coupling portions corresponding to those of said other member; and wherein said male coupling portions of said one member include a further pair of grooves adapted to couplingly engage with said further female coupling portions of said further member.

10. In a piece of furniture as defined in claim 8, wherein said one member comprises a first pair of spaced parallel surfaces, and a second pair of spaced parallel surfaces extending transversely of and connecting said surfaces of said first pair, one of said two pairs of grooves being provided in said one pair of surfaces and the other of said two pairs of grooves being provided in the other of said surfaces.

11. In a piece of furniture as defined in claim 9, whrein said one member comprises a first pair of spaced parallel surfaces, and a second pair of spaced parallel surfaces extending tranversely of and connecting said surfaces of said first pair, one of said two pairs of grooves and said further pair of grooves being provided in said one pair of surfaces and the other of said two pairs of grooves being provided in the other of said surfaces and being between said one pair of grooves and said further pair of grooves.

12. In a piece of furniture as defined in claim 11, wherein said other pair of said two pairs of grooves extends normal to the elongation of said one pair and said further pair of grooves.

13. A chair, comprising the combination of two spaced elongated first frame elements; two spaced elongated second frame elements each comprising two superimposed coextensive sections, said second elements extending at right angles to said first frame elements; an upright leg element provided at the junction of each of said first and second frame elements; female coupling means provided on the respective first and second frame elements, and male coupling means provided on the respective upright leg elements and being interengageable in response to movement in a given direction toward the respective leg element of the respective first and second frame elements at right angles to each other and to such respective leg element; and first and second connecting means respectively connecting said first frame elements to each other and connecting said second frame elements to each other, for normally preventing movement of such elements oppositely said given direction.

14. A chair, comprising the combination of two spaced elongated first frame elements; two spaced elongated second frame elements each comprising two superimposed coextensive sections, said second elements extending at right angles to said first frame elements; an upright leg element provided at the junction of each of said first and second frame elements; and coupling means for releasably coupling said elements to one another, said coupling means comprising female coupling means provided on the respective first and second frame elements, and male coupling means provided on the respective upright leg elements and being interengageable in response to movement in a given direction toward the respective leg element of the respective first and second frame elements longitudinally of the latter and at right angles to each other and to such respective leg element, and releasable in response only to movement of the respectively first and second frame elements in direction opposite said given direction but not in response to movement of the respective first and second frame elements in direction transversely of said given direction and of the elongation of the respective frame elements.

15. A chair as defined in claim 13, wherein said connecting means constitutes a seat of said chair.

16. A chair as defined in claim 15, wherein said second connecting means connects an upper section of one of said second frame elements with a lower section of the other of said second frame elements.

17. A chair as defined in claim 16, wherein said chair has a front and rear, and wherein said one second frame element is located at the front of said chair and said other second frame element is located at the rear of said chair.

18. A chair as defined in claim 15, wherein said first and second connecting means comprises respective webs extending cross-wise of one another.

19. A chair as defined in claim 13, wherein said upright leg elements each have upper portions extending upwardly above said frame elements and having free end sections; and further comprising two elongated arm-support members each paralleling one of said first frame elements and releasably connecting said free end sections of the upright leg elements associated with the respective first frame elements.

20. A chair as defined in claim 19; and further comprising a back-support member extending parallel to one of said second frame elements and connecting said arm-support members.

21. A chair as defined in claim 20; and further comprising releasable clamping means releasably connecting said back-support member with said arm-support members.

References Cited

UNITED STATES PATENTS

| | | | |
|---|---|---|---|
| 2,615,505 | 10/1952 | Friedlander | 297—443 |
| 2,720,253 | 10/1955 | Turner et al. | 297—442 |
| 3,167,352 | 1/1965 | Johnson | 297—445 |
| 3,222,108 | 12/1965 | Pablos | 297—441 |
| 3,262,405 | 7/1966 | Sutton | 297—442 X |

CASMIR A. NUNBERG, Primary Examiner

U.S. Cl. X.R.

297—422, 445